United States Patent [19]

Held

[11] 4,383,882
[45] May 17, 1983

[54] APPARATUS FOR SEALING INSERTS BETWEEN SHEETS OF PLASTIC MATERIAL

[76] Inventor: Kurt Held, Alte Strasse 1, D-7218 Trossingen 2, Fed. Rep. of Germany

[21] Appl. No.: 286,157

[22] Filed: Jul. 23, 1981

[30] Foreign Application Priority Data

Jul. 24, 1980 [DE] Fed. Rep. of Germany ....... 3028052

[51] Int. Cl.³ .............................................. B32B 31/08
[52] U.S. Cl. .................................. 156/552; 100/93 R; 100/93 RP; 100/153; 156/555; 156/583.5
[58] Field of Search ............... 156/242, 243, 282, 311, 156/312, 583.5, 552, 562, 555; 100/93 R, 93 RP, 151, 153

[56] References Cited

U.S. PATENT DOCUMENTS

| | | | |
|---|---|---|---|
| 2,510,229 | 6/1950 | Joa | 156/324 |
| 2,596,068 | 5/1952 | Bunch et al. | 156/552 |
| 3,783,666 | 1/1974 | Rosansby et al. | 156/555 |
| 4,193,830 | 3/1980 | Milne | 156/311 |
| 4,283,246 | 11/1981 | Held | 156/555 |

FOREIGN PATENT DOCUMENTS 376652 5/1964 Switzerland .

*Primary Examiner*—Caleb Weston
*Attorney, Agent, or Firm*—Toren, McGeady & Stanger

[57] ABSTRACT

A device is arranged to seal inserts between a pair of plastics material sheets. The device includes a double belt press forming a heat sealing press and made up of a pair of press belts one located above the other. Each of the press belts includes an inlet roller, an outlet roller and a belt trained over the inlet and outlet rollers. Supply or guide rollers direct the plastics material sheets onto the belts at the inlet rollers. The inlet rollers are heated and the guide rollers are selectively positionable relative to the inlet rollers so that the contact of the plastics material sheets with the belts at the inlet rollers can be selectively varied for providing the desired heating action. The inserts are sealed between the sheets as they pass between the press belts. At the outlet roller ends of the press belts the sealed inserts are separated from the plastics material sheets. The temperature of the heated inlet rollers is maintained within ±1° centigrade by circulating thermal oil through them. The guide rollers are supported from the inlet rollers by arms so that they can be pivoted about the axes of the inlet rollers.

4 Claims, 1 Drawing Figure

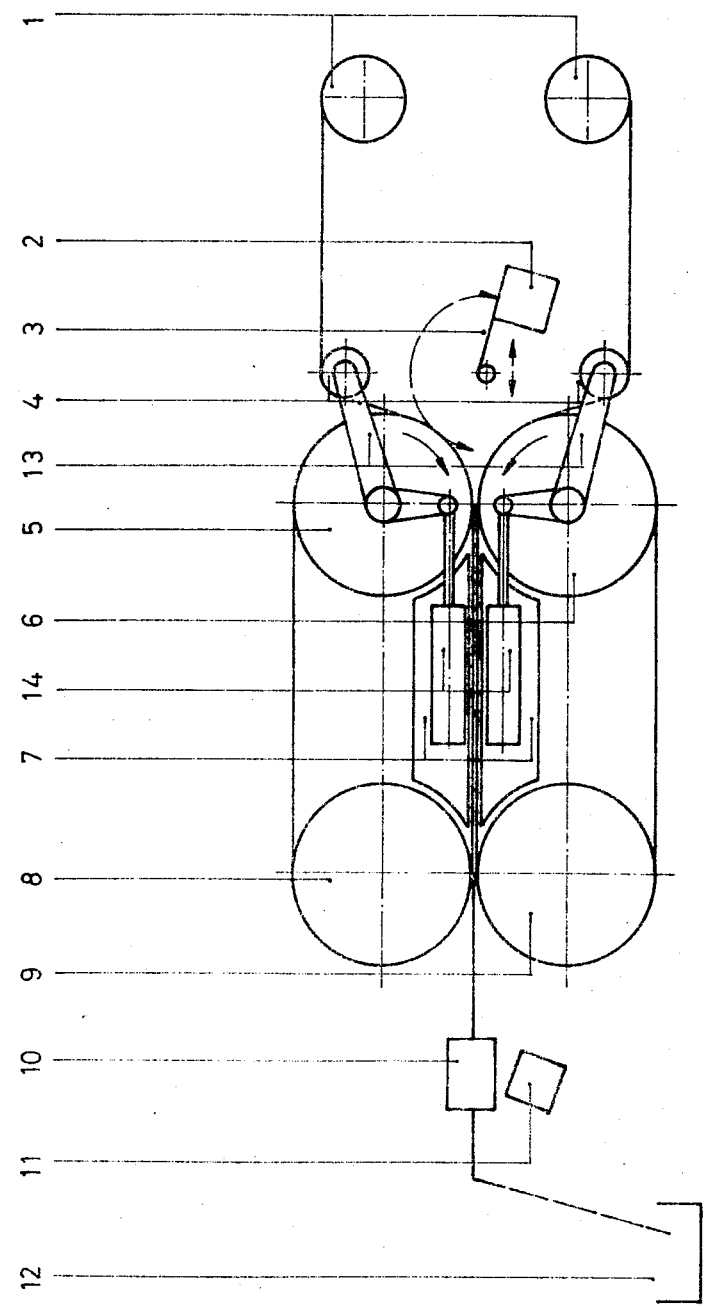

APPARATUS FOR SEALING INSERTS BETWEEN SHEETS OF PLASTIC MATERIAL

The invention relates to a machine device with a double belt press for heating, cooling, drying, precondensing, or the like of thermoplast and duroplast sheeting with and without sealing process. The device is particularly suitable for continuous sealing of documents, such as identification cards and the like.

In order to protect identification cards, checking cards and other documents against the possibilities of forgery, it was already attempted to enclose the documents, also called inlets, in highly transparent sheeting or to cover these documents with such sheeting. However, the protection against forgery in this type of covering is very limited because after breaking the usual covering there is always the possibility to forge the document in question. In addition, the covering of documents by welding the outer edges of overlapping sheeting is a very time-consuming and complicated procedure.

In addition to punched inlets for identification cards or credit cards, also other sheet-like materials, for instance of paper, fabrics, metal, fiber fleeces and the like, can be sealed in or embedded. The sheeting is fed from supply rollers over guide rollers into the press.

Besides thermoplastic layers as sealing sheeting, also hardenable impregnating and adhesive resins can be applied by means of the sheeting guide rollers. The sheeting guide rollers have in this case the function and construction of rolling mills, known per se, for the wet application of resins and solutions, and the periphery of the heating or cooling roller around which the carrier web is looped serves for the duration for controllable heat supply or heat removal.

The task of the present invention is to specify a machine device with which it is possible to achieve a satisfactory processing of thermoplast and duroplast sheeting or other material sheeting with inserts, particularly a forgery-proof sealing of documents of all types at very high output capacity. As far as the structural design of the heat-sealing press which operates according to the double belt principle is concerned, similar devices may be used as are described, for instance, in the German OS No. 27 37 629 or the German Pat. No. 27 35 142.

The solution of the task is imparted according to the invention by the technical teaching that the press part which is constructed as a heat-sealing press consists of heated inlet rollers with driving rollers and pressing belts and a brush-cooled pressure zone which lies in between, the material feeding section consists of supply rollers for the webs or sheeting, guide rollers and a pivotally or movably arranged vacuum feeder with inserts or inlets which is synchronously controlled with the upper belt of the press, and the finishing unit which is arranged at the outlet side consists of a punch press with a stacking device and a collector for the waste strips. The respective required temperature of the heated inlet rollers of the heat-sealing press is kept within $\pm 1°$ C. by means of thermal oil which is conducted through. The synchronous control of the vacuum feeder takes place by means of stops at the edge of the heated inlet rollers of the heat-sealing press. The vacuum feed slide is equipped to lift always six exactly aligned stacks of inlets or other inserts.

The guide rollers for the cover sheeting to be fed in are held by arms which are rotatably supported about the axial centers of the inlet rollers and are arranged so as to be pivoted radially upwardly or downwardly to vary the looping surface of the sheeting or webs on the surfaces of the heated inlet rollers. The control may take place automatically and during fluctuations in the temperature the looping surface of the sheeting on the inlet rollers can be increased or decreased by changing the looping angle so that the temperature can be kept within $\pm 1°$ C.

The FIGURE of the drawing shows schematically a machine device according to the invention.

The cover sheeting is pulled from the rollers 1 via guide rollers 4 into the roller gap formed by the heated inlet rollers 5, 6. The guide rollers 4 are arranged with respect to the heated guide rollers 5, 6 in such a way that a looping is guaranteed which is sufficient for heating the foil to the sealing temperature. The temperature of the guide rollers 5, 6 is kept within $\pm 1°$ C. with thermal oil which is conducted through.

The photo inlets or inserts are lifted by a vacuum feed slide 3 from several, for instance six, exactly aligned stacks 2, are turned by approximately 180° in the horizontal and by impact on synchronizing stops which are applied at the guide roller periphery are pushed into the clamping roller gap. The feed slide 3 is briefly ventilated, returned and swiveled to receive the next photo inlets or inserts. After the sheeting enters between the heated forming belts, of which at least the upper belt is synchronized by means of a belt tooth connection to the synchronizing stops at the guide roller, into the reaction zone or pressure zone 7, the heat is removed from the forming belts by cooling brushes which brush the reverse side of the belt.

The sealed web which emerges at the driving rollers 8,9 is scanned by a light-dark sensor along the front edge of the first row of inlets, after scanning the web is clamped by the punch press 10, the identification cards are punched out and are caught in several, for instance six, height-controlled stacks 11. The punched strip is cut off, offset by one punched piece, and caught in a container 12.

With the aid of pneumatic or hydraulic means, for instance the cylinders 14, the arms 13 which hold the guide rollers 4 can be adjusted upwardly or downwardly and thus the looping surface of the sheeting or webs on the heatable inlet rollers 5, 6 can be increased or decreased.

The unit operates automatically with the exception of loading and unloading of the stacks 2 and 11 of inserts or inlets, inserting the sheeting or material web rollers 1 and removal of the waste at 12.

The two polyethylene heat-sealing sheets may also be replaced with a polyethylene laminate. An alternative to the described process consists in replacing the two polyethylene heat-sealing sheets with a polyethylene laminate which embeds the photo inlets or inserts into a duroplast laminate on a resin impregnated carrier web and under a pre-gelled polyethylene cover layer.

Such a card could not be opened with any means without destroying the individual fiber of the inlet or insert, would be just as resistant to solvents as polybutylene terephthalate sheeting would as a duroplast could no longer be thermally affected and would be independent from the adhesion of the polybutylene-terephthalate-polyethylene composite action.

I claim:

1. A device for the continuous sealing of inserts between sheets of plastics material for instance for sealing documents such as identification cards and the like, comprising a pair of press belts one positioned above the other and forming a double belt press so that the sheets of plastics material and the inserts located between them pass through the double press belt between the pair of press belts, each said press belt comprising an inlet roller, an outlet roller and a belt trained over said inlet and outlet rollers, said inlet rollers disposed in closely spaced relation and forming a gap between said belts trained over said inlet rollers, means located within said press belts between said inlet and outlet rollers for pressing said belts together and for pressing the plastics material sheets arranged to pass between said press belts into sealing contact, means for feeding the plastics material sheets to the gap between said inlet rollers for passage between said press belts, said feeding means including a guide roller connected to each said inlet roller and a supply roller forming a source of the plastic material sheet, a feed device for supplying inserts from a source to the gap between said inlet rollers, and means located adjacent to and spaced outwardly from said outlet rollers for separating the sealed inserts from the sealed plastics material sheets after passage between said press belts, wherein the improvement comprises that said inlet rollers are heated, each said guide roller is mounted for pivotal movement about the axis of said inlet roller with which it is connected, means for pivotally displacing said guide rollers about the axes of said inlet rollers for selectively varying the contact of the plastics material sheets with said belts passing over said inlet rollers, said means for pivotally displacing comprising an arm pivotally connected at one end to the axis of rotation of said inlet roller and secured at the other end to said guide roller, said feed device comprises a vacuum feeder arranged to be synchronously controlled by the upper said press belt, and said means for separating the sealed inserts comprises a punch press, a stacking device, and a collector for waste strip of the plastics material sheets.

2. A device, as set forth in claim 1, including means for circulating thermal oil through said inlet rollers for maintaining the temperature within a range of ±1° centigrade.

3. A device, as set forth in claim 1 or 2, including stops located on the edge of said inlet rollers for effecting synchronized control of said vacuum feeder.

4. A device, as set forth in claim 3, wherein said vacuum feeder is arranged to lift exactly six aligned inserts.

* * * * *